(12) United States Patent
Murata et al.

(10) Patent No.: US 7,060,891 B2
(45) Date of Patent: Jun. 13, 2006

(54) THERMOPHOTOVOLTAIC GENERATOR APPARATUS

(75) Inventors: Kiyohito Murata, Susono (JP); Hideki Nakayama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 224 days.

(21) Appl. No.: 10/625,535

(22) Filed: Jul. 24, 2003

(65) Prior Publication Data
US 2004/0118450 A1  Jun. 24, 2004

(30) Foreign Application Priority Data
Aug. 1, 2002 (JP) ............................. 2002-225000

(51) Int. Cl.
*H01L 31/52* (2006.01)
*H01L 31/58* (2006.01)

(52) U.S. Cl. ...................... 136/253; 136/246; 136/259; 257/433; 431/100

(58) Field of Classification Search ............... 136/253, 136/246, 259; 257/433; 431/100
See application file for complete search history.

(56) References Cited

U.S. PATENT DOCUMENTS

| | | | | |
|---|---|---|---|---|
| 3,237,683 | A * | 3/1966 | Silversmith | 252/390 |
| 4,707,560 | A * | 11/1987 | Hottel et al. | 136/253 |
| 4,836,862 | A * | 6/1989 | Pelka et al. | 136/253 |
| 5,312,521 | A * | 5/1994 | Fraas et al. | 136/253 |
| 5,711,661 | A * | 1/1998 | Kushch et al. | 431/329 |
| 5,772,793 | A * | 6/1998 | Ashcroft et al. | 136/253 |
| 2002/0148498 | A1 | 10/2002 | Nakayama et al. | |
| 2002/0153035 | A1 | 10/2002 | Nakayama et al. | |
| 2004/0244830 | A1 * | 12/2004 | Hokoi et al. | 136/253 |
| 2005/0074646 | A1 * | 4/2005 | Rajashekara et al. | 429/26 |

FOREIGN PATENT DOCUMENTS

| | | |
|---|---|---|
| JP | 61-224369 | 10/1986 |
| JP | 2-502692 | 6/1988 |
| JP | 63-316486 | 12/1988 |

(Continued)

OTHER PUBLICATIONS

*Research and Development on Organization of Environment-Conscious High Efficiency Power Generator for Next Generation*, Engineering Advancement Association of Japan, 1997 Social Development System Planning Project Report, (Mar. 1998), (Abstract is translated).

(Continued)

*Primary Examiner*—Alan Diamond
(74) *Attorney, Agent, or Firm*—Finnegan, Henderson, Farabow, Garrett & Dunner, LLP

(57) ABSTRACT

A thermophotovoltaic generator apparatus has: a burner that is supplied with a fuel and an air, and burns the fuel; an emitter heated by combustion heat produced by the burner; a photoelectric conversion cell that converts radiant light from the emitter into electric power; and a cell holder portion that holds the photoelectric conversion cell. A cooling device is provided for causing a cooling liquid to receive heat from the photoelectric conversion cell by contacting the cooling liquid and a back surface of the cell holder portion with each other. A surface of the cell holder portion that contacts the cooling liquid is a non-horizontal surface. The apparatus employs at least two kinds of cooling liquids.

5 Claims, 5 Drawing Sheets

FOREIGN PATENT DOCUMENTS

| | | |
|---|---|---|
| JP | 2000-68545 | 3/2000 |
| JP | 2000-106001 | 4/2000 |
| JP | 2000-106452 | 4/2000 |
| JP | 200102166 A | 3/2001 |
| JP | 2001-210852 | 8/2001 |
| JP | 2002078366 A | 3/2002 |
| WO | WO 03/017376 A1 * | 2/2003 |

OTHER PUBLICATIONS

Japanese Office Action dated Dec. 17, 2005.

* cited by examiner

THERMOPHOTOVOLTAIC GENERATOR APPARATUS

INCORPORATION BY REFERENCE

The disclosure of Japanese Patent Application No. 2002-225000 filed on Aug. 1, 2002, including its specification, drawings and abstract, is incorporated herein by reference in its entirety.

BACKGROUND OF THE INVENTION

1. Field of the Invention

The invention relates to a thermophotovoltaic generator apparatus (TPV system) that generates electric power through the thermophotovoltaic energy conversion in which infrared light (also termed infrared ray or heat ray) radiated from a heat source is converted into electric power by photoelectric conversion elements (photoelectric conversion cells).

2. Description of the Related Art

In a photovoltaic generator apparatus, an emitter (radiator) is heated to radiate infrared light of a predetermined wavelength, and the infrared light is caused to strike photoelectric conversion elements, and is thereby converted into electric power. The photovoltaic generator apparatus, being free of movable portions, allows realization of a low-noise and low-vibration system.

The photovoltaic generation of power is excellent as a next-generation energy source in terms of its cleanliness, quietness, etc. To heat the emitter, various heat sources are available, for example, combustion heat, solar heat, atomic decay heat, etc. Normally, a combustion gas produced by burning a fossil fuel represented by such gas fuels as butane and the like, and such liquid fuels as kerosene and the like, is used for heating the emitter.

The thermophotovoltaic generator apparatuses require a consideration of a cooling structure for cooling the photoelectric conversion cells and recovering heat therefrom.

SUMMARY OF THE INVENTION

It is an object of the invention to provide a thermophotovoltaic generator apparatus that is further improved in the cooling (heat recovery) performance so as to increase the energy conversion efficiency.

In accordance with the invention, a thermophotovoltaic generator apparatus includes: a burner that is supplied with a fuel and an air, and that burns the fuel; an emitter heated by a combustion heat produced by the burner; a photoelectric conversion cell that converts a radiant light from the emitter into an electric power; and a cell holder portion that holds the photoelectric conversion cell. A cooling device is provided for causing a cooling liquid to receive a heat from the photoelectric conversion cell by contacting the cooling liquid and a back surface of the cell holder portion with each other. In this apparatus, a surface of the cell holder portion that contacts the cooling liquid is a non-horizontal surface.

In the above-described thermophotovoltaic generator apparatus, the cooling liquid may include at least two kinds of liquids.

The at least two kinds of liquids may include two liquids that have a relationship in which one of the liquids has a greater specific gravity and a lower boiling point than another one of the liquids.

The thermophotovoltaic generator apparatus may further include an external circuit that accelerates circulation of the cooling liquid.

The external circuit may have a fan that improves a heat dissipation characteristic.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Preferred embodiments of the invention will be described hereinafter with reference to the accompanying drawings.

Figure 1:
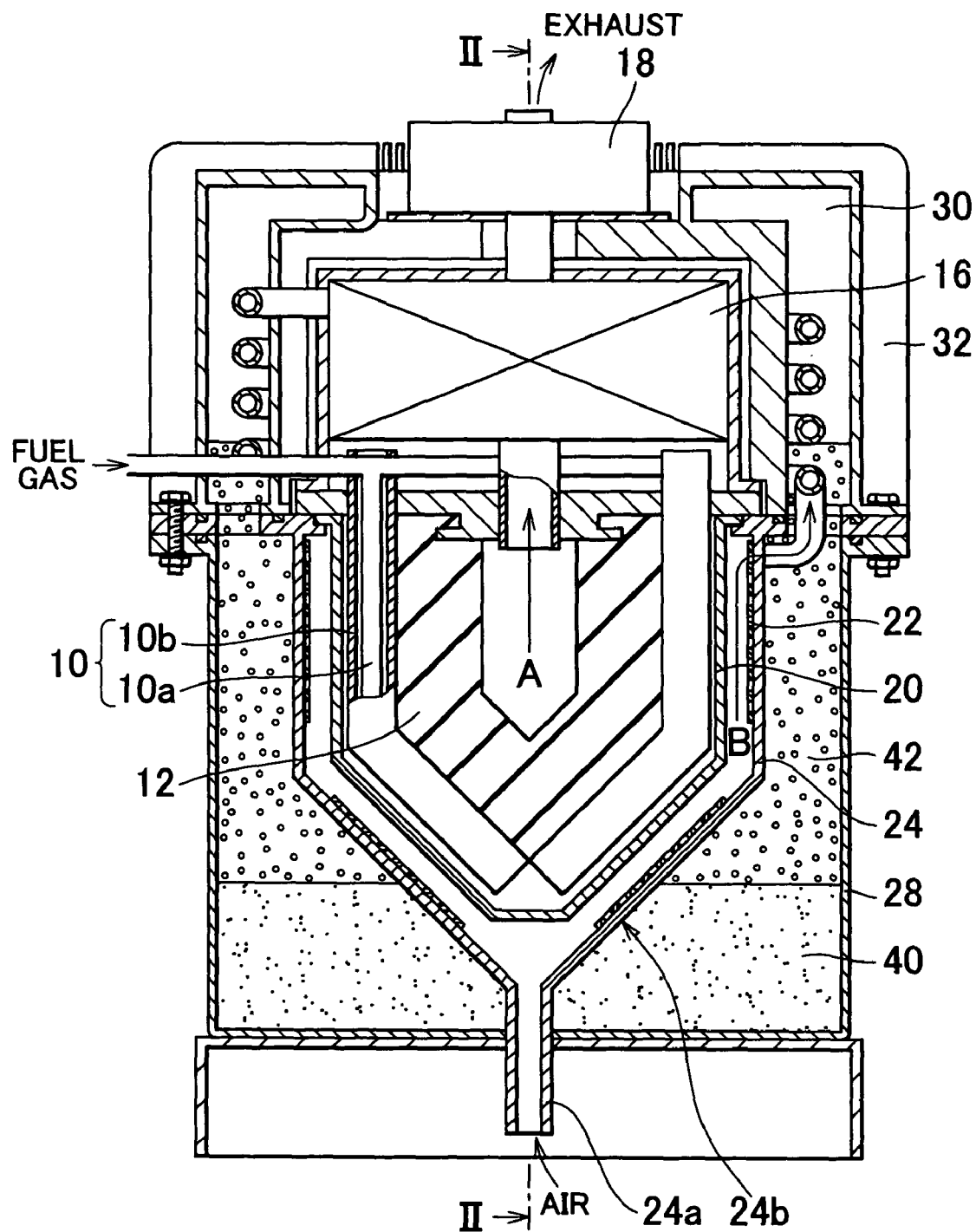
FIG. 1 is a partial sectional view of a thermophotovoltaic generator apparatus in accordance with a first embodiment of the invention, illustrating a state of the apparatus prior to operation.
Figure 2:
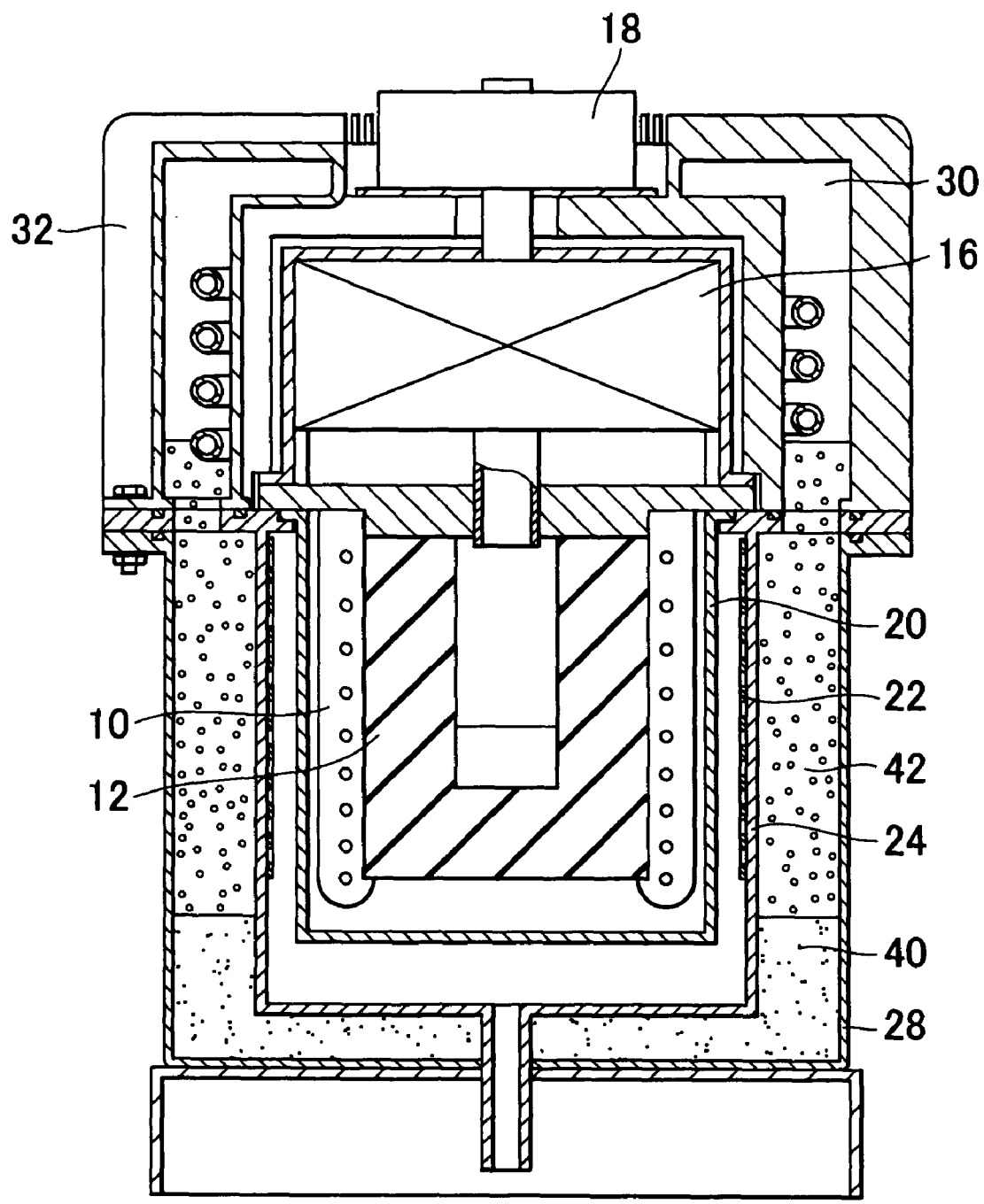
FIG. 2 is a partial sectional view taken along line II—II in FIG. 1.

FIG. 1 is a partial sectional view of a thermophotovoltaic generator apparatus in accordance with a first embodiment of the invention, illustrating a state of the apparatus prior to operation. FIG. 2 is a partial sectional view taken along line II—II in FIG. 1. Inside the generator apparatus, a fuel gas passageway 10a is contained within an air passageway 10b, and the fuel gas passageway 10a and the air passageway 10b form a burner 10.

An emitter 12 is formed of a porous material of SiC or $Al_2O_3$ so as to have a container-like shape. After gas exits from the burner 10 and burns, the combustion gas passes through the emitter 12 while giving heat to the emitter 12. The gas from the emitter 12 enters a heat exchanger 16 via a path A. The air to be supplied to the burner 10 flows into the heat exchanger 16 via a path B.

The combustion gas, after being subjected to heat exchange with air in the heat exchanger 16, is discharged out as exhaust gas via an exhaust fan 18. The exhaust fan 18 performs the function of introducing air by sucking and discharging exhaust gas.

Heat absorbed by the emitter 12 exits in the form of light from surfaces of the emitter 12 due to radiation. The light from the emitter 12 passes through an $SiO_2$ glass 20 that forms a combustion chamber, and then enters photoelectric conversion cells 22, whereby the light is converted into electricity.

In the drawings, reference numeral 24 represents a cell holder portion formed of a highly heat conductive substance such as Al or the like. Air introduced into the cell holder portion 24 via a lower portion 24a of the cell holder portion 24 cools the photoelectric conversion cells 22, and passes through the heat exchanger 16 as described above, and then flows into the air passageway 10b that forms the burner 10.

An outer shell member 28, together with the cell holder portion 24, defines a closed space in which a cooling liquid is contained. A cooling chamber 30 has cooling fins 32. Vapor occurring from the cooling liquid retained between the outer shell member 28 and the cell bolder portion 24 is cooled in the cooling chamber 30, and is returned therefrom.

A portion of the heat generated by the photoelectric conversion cells 22 is given to the aforementioned cooling liquid, and another portion is given to the air, and the rest is released outside via the outer shell member 28. The thus-warmed air enters the heat exchanger 16, and receives heat from the exhaust gas and is therefore heated to high temperature. The high-temperature air mixes with the fuel supplied via the fuel gas passageway 10a. The mixture is jetted from the burner 10 and therefore burns, heating the emitter 12. Light radiated from the emitter 12 is converted into electricity by the photoelectric conversion cells 22.

The photoelectric conversion efficiency of the photoelectric conversion cells 22 is about 60% at the maximum. If each photoelectric conversion cells 22 has an output of 3 W/cm$^2$, the cells produce substantially equal amounts of heat. Therefore, efficient recovery of the heat and return thereof to the emitter is most critical to improvement in efficiency. Furthermore, photoelectric conversion cells degrade in conversion efficiency as the temperature rises. Therefore, the cooling is important in this sense, too.

This embodiment employs as the aforementioned cooling liquid a first liquid 40 and a second liquid 42 that are retained between the outer shell member 28 and the cell holder portion 24. For example, the first liquid 40 is "Fluorinert" (a trademark of 3M in US, which has a specific gravity of 1.7, and is water-insoluble, and has a boiling point of about 50° C.), and the second liquid 42 is water in this embodiment.

Figure 3:
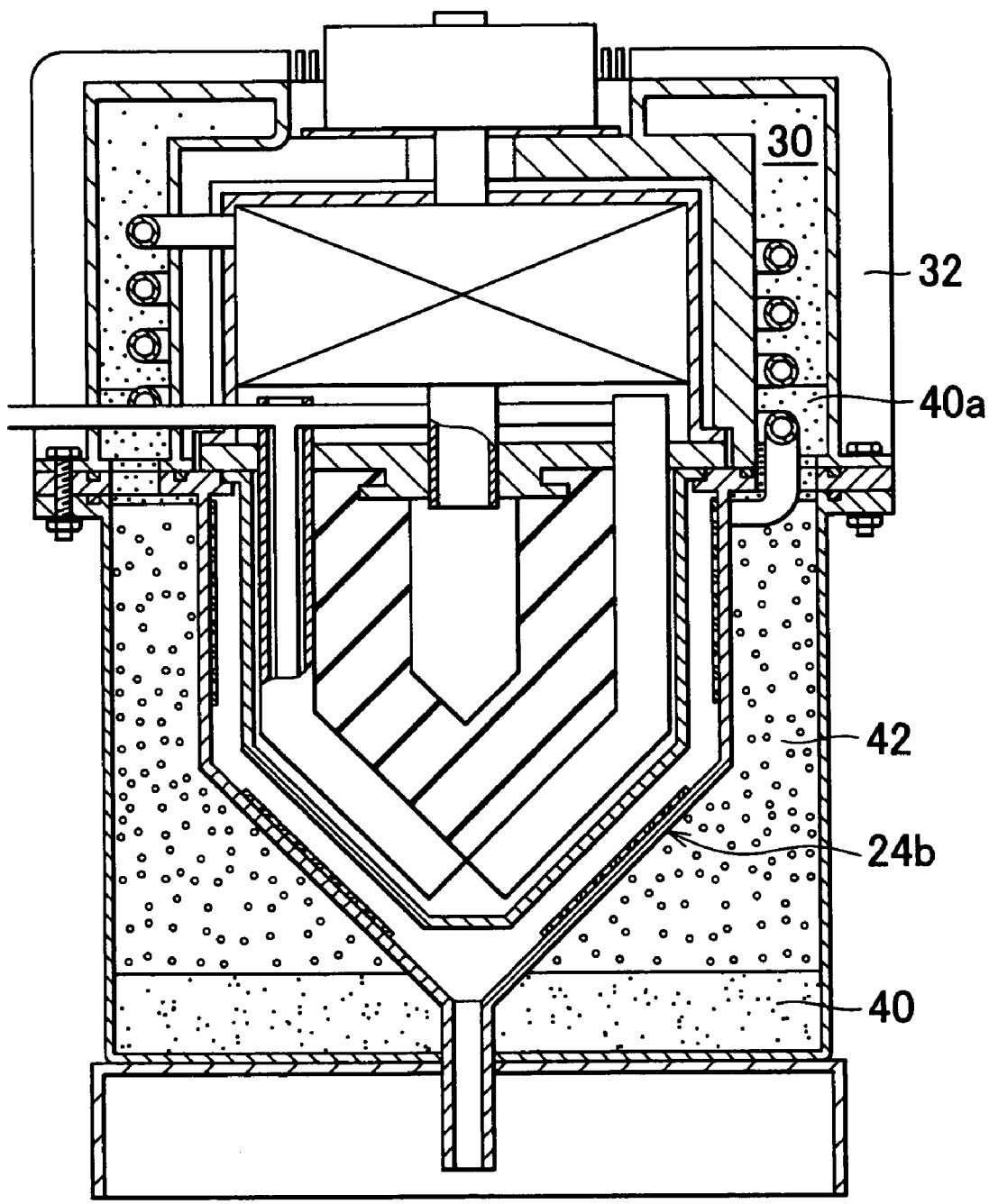
FIG. 3 is a partial sectional view of the thermophotovoltaic generator apparatus of the first embodiment, illustrating a state of the apparatus during operation.

Next, the state of the thermophotovoltaic generator apparatus of the embodiment during operation will be described with reference to FIG. 3. After the combustion for power generation starts, the Fluorinert 40, having a comparatively low boiling point, starts boiling first. As a result, the Fluorinert 40 moves to above the water 42, and then cools and accumulates in the cooling chamber 30, as indicated in FIG. 3. The accumulated Fluorinert 40a has a greater specific gravity than water, and therefore moves toward the water 42. However, if the water 42 has high temperature, the Fluorinert 40a immediately boils and returns to the cooling chamber 30. It is to be noted that heat is released via the cooling fins 32.

A cooling water contact surface (heat transfer surface) 24b of the cell holder portion 24 in this embodiment is an inclined surface, that is, a non-horizontal surface, as shown in FIG. 1.

In the embodiment illustrated in FIG. 1, since the cooling water contact surface 24b of the cell holder portion 24 is formed as an inclined or non-horizontal surface, bubbles do not attach to the cooling water contact surface 24b.

Next, attachment of bubbles will be considered. Bubbles are likely to attach to asperities of the back surface of the cell holder portion 24. This is a characteristic of attachment of a fluid, such as a liquid or gas, to a solid. In order to prevent or reduce this attachment, the invention simultaneously uses at least two kinds of cooling liquids.

For example, this embodiment uses the Fluorinert 40 and the water 42. The Fluorinert 40 receives heat mainly from the water 42, and then evaporates. As shown in FIG. 1, the cell holder portion 24 in contact with the back side of the photoelectric conversion cells 22 is covered with the water 42. Thus, the solid asperities of the back wall surface of the cell holder portion 24 are filled by the water 42, so that it is unlikely that bubbles of the Fluorinert 40 will attach to the wall.

Furthermore, the Fluorinert 40 is allowed to absorb heat from the water 42 before the Fluorinert 40 reaches the cooling chamber 30. Therefore, good heat absorption is achieved. This will be more specifically explained. The water temperature is higher in a top portion of the water than in a bottom portion thereof. Therefore, as bubbles of the Fluorinert 40 ascend, the Fluorinert bubbles continuously absorb heat.

Thus, it is important that one of the liquids have a greater specific gravity and a lower boiling point than the other liquid. That is, the liquid that mainly contacts the cell holder portion 24 is a liquid that has a higher boiling point than one of the liquids that exists at a lower site.

Figure 4:
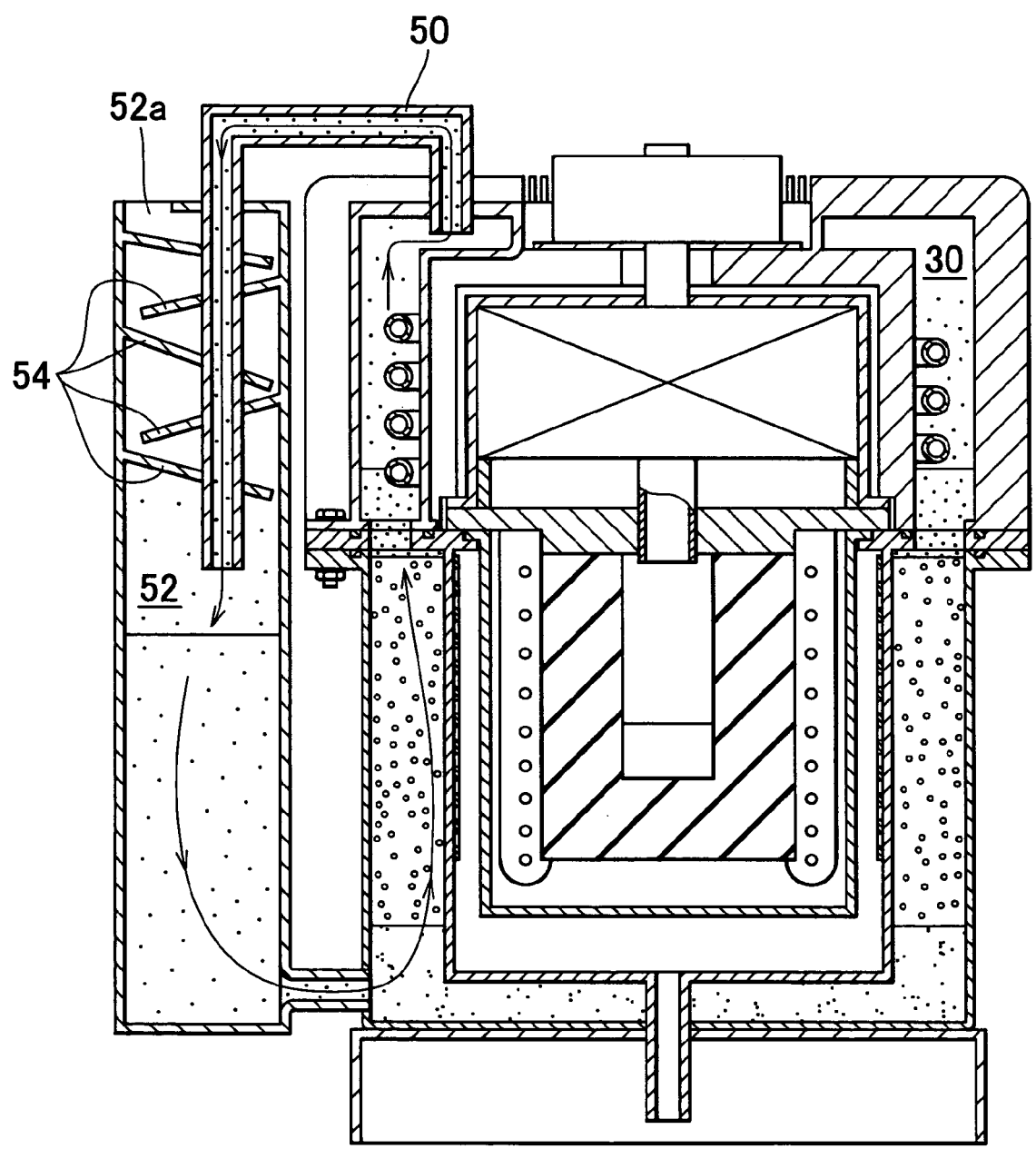
FIG. 4 is a partial sectional view of a thermophotovoltaic generator apparatus in accordance with a second embodiment of the invention.

FIG. 4 is a partial sectional view of a thermophotovoltaic generator apparatus in accordance with a second embodiment of the invention. In this embodiment, a cooling chamber 30 is connected in communication to a separate chamber 52 via a pipe 50. The separate chamber 52 is open to the atmosphere via an opening 52a. However, leakage from the separate chamber 52 is prevented by a labyrinth 54.

As the boiling of the Fluorinert becomes brisk, Fluorinert gas exits from the cooling chamber 30, and flows through the pipe 50 to the separate chamber 52 to reside therein. Since circulation occurs as indicated by arrows in FIG. 4, the cooling efficiency improves. Thus, this embodiment is characterized in provision of an external circuit that accelerates the circulation of the cooling liquid.

Figure 5:
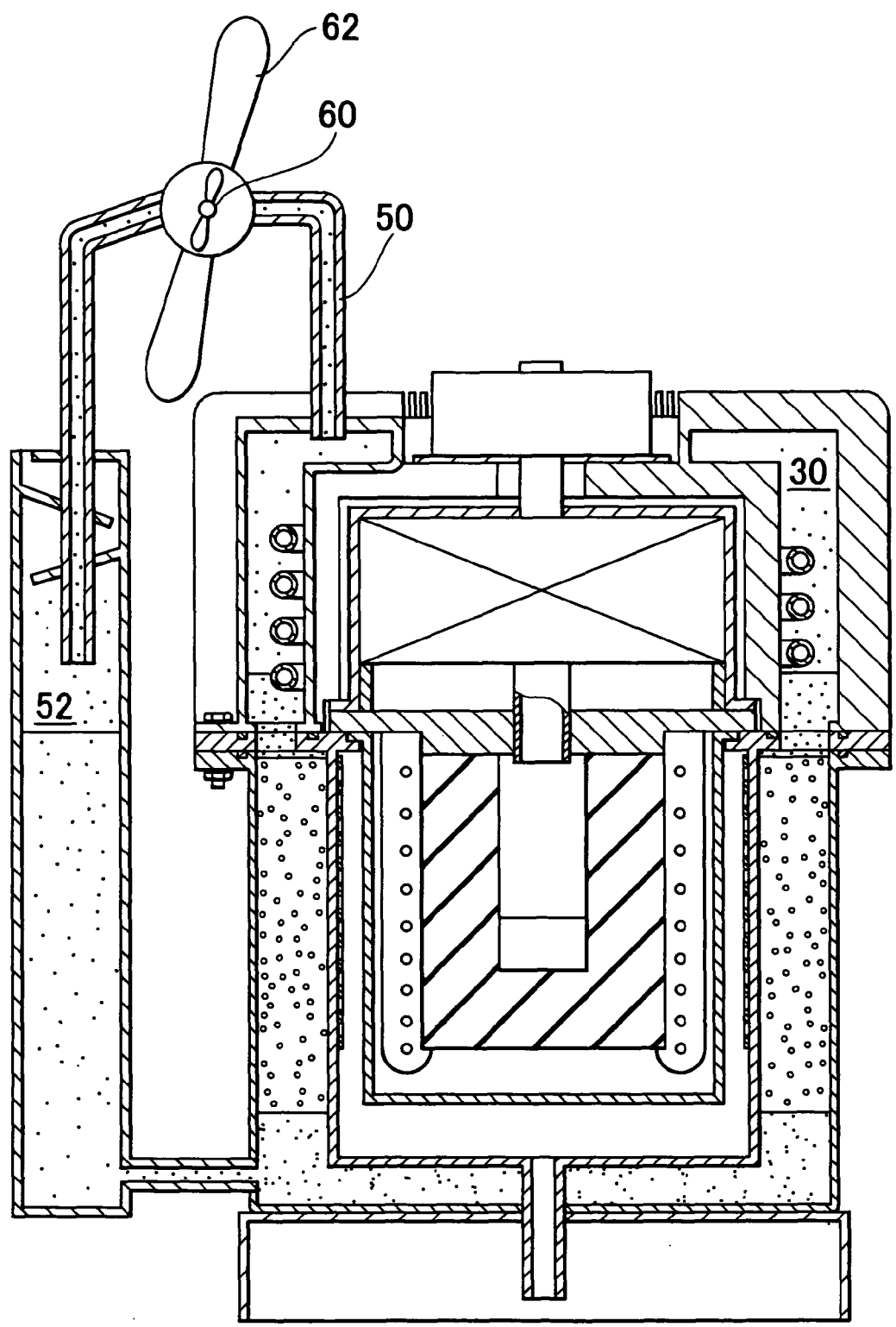
FIG. 5 is a partial sectional view of a thermophotovoltaic generator apparatus in accordance with a third embodiment of the invention.

FIG. 5 is a partial sectional view of a thermophotovoltaic generator apparatus in accordance with a third embodiment of the invention. The third embodiment is a modification of the second embodiment. Specifically, an intermediate portion of a pipe 50 as mentioned above is provided with a fan 60 that is driven by steam of Fluorinert. In turn, the fan 60 rotates a propeller 62.

The fan 60 and the propeller 62 thus provided absorb kinetic energy from the Fluorinert, thus improving the cooling performance. A current of air produced by the propeller 62 is sent to a major body of the thermophotovoltaic generator apparatus, thereby further improving the cooling performance. Thus, this embodiment is characterized in that an external circuit as mentioned above is equipped with a fan that enhances the heat dissipation.

According to the thermophotovoltaic generator apparatuses of the foregoing embodiments of the invention, the cooling (heat recovery) performance is further enhanced. Therefore, the apparatuses of the embodiments achieve an advantage of further improved energy conversion efficiency.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A thermophotovoltaic generator apparatus comprising:
   a burner that is supplied with a fuel and an air, and that burns the fuel;
   an emitter heated by a combustion heat produced by the burner;

a photoelectric conversion cell that converts a radiant light from the emitter into electric power;

a cell holder portion that holds the photoelectric conversion cell;

a cooling device that causes a cooling liquid, said liquid comprising at least two kinds of liquids, a first of the at least two kinds of liquids having a greater specific gravity and a lower boiling point than a second of said at least two kinds of liquid, to receive heat from the photoelectric conversion cell by contacting the cooling liquid and a back surface of the cell holder portion with each other; and a cooling chamber;

wherein a surface of the cell holder portion that contacts the cooling liquid is a non-horizontal surface;

wherein said first liquid is provided at a lower level than said second liquid;

wherein when said first liquid boils, a first portion of a first vapor therefrom absorbs heat from said second liquid; and wherein a second portion of said first vapor is cooled in the cooling chamber and returns to said lower level as liquid.

2. The thermophotovoltaic generator apparatus according to claim 1, further comprising an external circuit that accelerates circulation of the cooling liquid.

3. The thermophotovoltaic generator apparatus according to claim 2, wherein the external circuit has a fan that improves a heat dissipation characteristic.

4. A thermophotovoltaic generator apparatus comprising:

a burner that is supplied with a fuel and air, and that burns the fuel;

an emitter heated by a combustion heat produced by the burner;

a photoelectric conversion cell that converts a radiant light from the emitter into electric power;

a cell holder portion that holds the photoelectric conversion cell;

an outer shell member surrounding the cell holder portion containing a cooling liquid, the cooling liquid comprising at least two kinds of liquids, a first of the at least two kinds of liquids having a greater specific gravity and lower boiling point than a second of the at least two kinds of liquids, to receive heat from the photoelectric conversion cell by bringing the cooling liquid and a surface of the cell holder portion in contact with each other, and a cooling chamber;

wherein a surface of the cell holder portion that contacts the cooling liquid is a non-horizontal surface;

wherein said first liquid is provided at a lower level than said second liquid:

wherein when said first liquid boils, a first portion of a first vapor therefrom absorbs heat from said second liquid: and wherein a second portion of said first vapor is cooled in the cooling chamber and returns to said lower level as liquid.

5. A thermophotovoltaic generator apparatus according to claim 4, wherein the cooling chamber comprises a plurality of cooling fins.

* * * * *

UNITED STATES PATENT AND TRADEMARK OFFICE
CERTIFICATE OF CORRECTION

PATENT NO. : 7,060,891 B2  
APPLICATION NO. : 10/625535  
DATED : June 13, 2006  
INVENTOR(S) : Kiyohito Murata et al.

Page 1 of 1

It is certified that error appears in the above-identified patent and that said Letters Patent is hereby corrected as shown below:

Cover Page, Item (56) under "FOREIGN PATENT DOCUMENTS",
    insert -- JP 2001-82166    03/2001--; and
          -- JP 2002-78366    03/2002--.

Signed and Sealed this

Twenty-third Day of January, 2007

JON W. DUDAS
*Director of the United States Patent and Trademark Office*